United States Patent
Cai et al.

(10) Patent No.: US 12,482,368 B1
(45) Date of Patent: Nov. 25, 2025

(54) METHODS FOR MULTI-DIMENSIONAL SUPER-RESOLUTION TARGET SENSING BASED ON 5G AEROMACS

(71) Applicant: BEIHANG UNIVERSITY, Beijing (CN)

(72) Inventors: Kaiquan Cai, Beijing (CN); Yanbo Zhu, Beijing (CN); Zhibo Zhang, Beijing (CN); Hongshuo Lyu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 19/216,692

(22) Filed: May 22, 2025

(30) Foreign Application Priority Data

Apr. 22, 2025 (CN) .......................... 202510502349.3

(51) Int. Cl.
*G06F 17/00* (2019.01)
*A01M 29/32* (2011.01)
(Continued)

(52) U.S. Cl.
CPC ............... *G08G 5/80* (2025.01); *A01M 29/32* (2013.01); *G01S 7/006* (2013.01); *G01S 13/86* (2013.01);
(Continued)

(58) Field of Classification Search
CPC .......... G08G 5/80; A01M 29/32; G01S 7/006; G01S 13/86; G01S 13/913; H04L 27/2646
(Continued)

(56) References Cited

U.S. PATENT DOCUMENTS 10,332,405 B2 * 6/2019 Kopardekar ............. G08G 5/22
2013/0329052 A1 * 12/2013 Chew .................... G06T 7/0008
348/159
(Continued)

FOREIGN PATENT DOCUMENTS

CA 3113406 A1 * 3/2020 ............. G06V 20/20
CN 109085531 12/2018
(Continued)

OTHER PUBLICATIONS

A Deep Learning Framework for Real-Time Bird Detection and Its Implications for Reducing Bird Strike Incidents (Year: 2024).*

*Primary Examiner* — Ronnie M Mancho
(74) *Attorney, Agent, or Firm* — PORUS IP LLC

(57) ABSTRACT

Provide is a method for multi-dimensional super-resolution target sensing based on a 5G AeroMACS. The method includes modulating data to be transmitted into a plurality of OFDM symbols using the 5G AeroMACS and transmitting the OFDM symbols, receiving the OFDM symbols in the air via a plurality of receiving antennas, performing data recovery and stacking recovered data into a 3D data tensor, and storing the 3D data tensor into a 3D complex matrix, obtain a multi-dimensional super-resolution spectrogram; obtaining a final target sensing result by using a 3D-CFAR detection algorithm; determining an adjusted operating power level of each of bird-repelling devices in different regions based on the target sensing result; controlling one or more bird-repelling devices in a designated region to operate to repel birds in the designated region; and generating a vehicle regulation instruction and sending the vehicle regulation instruction to a plurality of UAVs to control the plurality of UAVs to drive away from a warning region.

19 Claims, 9 Drawing Sheets

(51) Int. Cl.
  *G01S 7/00* (2006.01)
  *G01S 13/86* (2006.01)
  *G01S 13/91* (2006.01)
  *G08G 5/80* (2025.01)
  *H04L 27/26* (2006.01)

(52) U.S. Cl.
  CPC ........ *G01S 13/913* (2013.01); *H04L 27/2646* (2013.01)

(58) Field of Classification Search
  USPC .......................................................... 701/120
  See application file for complete search history.

(56) References Cited

U.S. PATENT DOCUMENTS

2016/0275801 A1* 9/2016 Kopardekar ............. G08G 5/55
2020/0319324 A1* 10/2020 Au ........................ H04W 48/16

FOREIGN PATENT DOCUMENTS

| CN | 110609262 | A |   | 12/2019 |   |   |
|----|-----------|---|---|---------|---|---|
| CN | 115480237 | A |   | 12/2022 |   |   |
| CN | 117420539 |   |   | 1/2024  |   |   |
| CN | 118444273 | A |   | 8/2024  |   |   |
| CN | 119255373 |   |   | 1/2025  |   |   |
| EP | 2678835   | B1 | * | 8/2017 | ............. | H04N 7/181 |
| EP | 3695783   | A1 | * | 8/2020 | ............. | G06V 20/56 |
| JP | 2014513642 | A | * | 6/2014 | ............. | H04N 7/181 |
| JP | 6110316   | B2 | * | 4/2017 | ............. | H04N 7/181 |
| JP | 2020203075 | A | * | 12/2020 | ............. | B60L 50/20 |
| JP | 2022122967 | A | * | 8/2022 | ............. | G01C 21/20 |
| KR | 20240171035 | A | * | 12/2024 | ............. | G06Q 50/08 |
| KR | 20250050008 | A | * | 4/2025 | ............. | G06Q 20/065 |
| KR | 20250078844 | A | * | 6/2025 | ............... | H04N 7/18 |
| WO | WO-2012115594 | A1 | * | 8/2012 | ............. | H04N 7/181 |

* cited by examiner

METHODS FOR MULTI-DIMENSIONAL SUPER-RESOLUTION TARGET SENSING BASED ON 5G AEROMACS

CROSS-REFERENCE TO RELATED APPLICATIONS

This application claims priority to Chinese Patent Application No. 202510502349.3, filed on Apr. 22, 2025, the entire contents of which are incorporated herein by reference.

TECHNICAL FIELD

The present disclosure belongs to the field of communication and sensing integration, specifically relating to a method for multi-dimensional super-resolution target sensing based on a 5G-enhanced aeronautical mobile airport communications system (5G AeroMACS).

BACKGROUND

The rapid growth of the aviation industry has made airport security monitoring critical. A key task in airport security monitoring is to achieve high-definition monitoring and identification of moving targets, such as airplanes, vehicles, and people within airports. This high-definition monitoring is decisive for preventing runway incursions, improving the efficiency of airport operations, and ensuring flight safety. Although traditional monitoring technologies, such as radar and sensor networks, may provide monitoring data, they fall short in terms of accuracy, data processing speed, and real-time response. These deficiencies challenge the safe operation of the airports and limit the efficiency and safety of air transportation.

The 5G AeroMACS, as an emerging aeronautical broadband communication technology, can transmit operational service information within civil aviation airports in a secure and efficient manner using a dedicated frequency. Combined with BeiDou high-precision positioning technology, the 5G AeroMACS can significantly enhance communication efficiency between airports, air traffic management, and airlines, thereby improving the ability to monitor the operational situation of the airports. The application of the 5G AeroMACS is of great significance in preventing vehicles from intruding into runways and can facilitate the synergistic operation of aircraft, vehicles, runways, and facilities, thus enhancing the safety of airport operations.

An integrated communication and sensing technology has opened new avenues for improving airport monitoring capabilities. A highly integrated system, based on a simultaneous same-beam mechanism, primarily includes a linear frequency modulation wave technique, a signal separation technique, and an orthogonal frequency-division multiplexing (OFDM) technique. By modulating the linear frequency modulation wave to carry communication information, an integrated signal may simultaneously achieve radar detection and communication functions. However, the challenge lies in a low communication rate, which makes practical communication requirements difficult to be satisfied. The signal separation technique integrates a radar signal and a communication signal at a transmitting end, and separates the radar signal and the communication signal at a receiving end through an additive signal separation approach or a multiplicative signal separation approach. The linear frequency modulation wave technique has limited integration capability, as the communication signal occupies part of a transmission power of the radar signal, thus affecting radar detection performance.

SUMMARY

To address the deficiencies in the existing technologies, one or more embodiments of the present disclosure provide a method for multi-dimensional super-resolution target sensing based on a 5G-enhanced aeronautical mobile airport communications system (5G AeroMACS). The method leverages a 5G AeroMACS OFDM communication regime to realize super-resolution detection of multi-dimensional targets at an airport, which not only facilitates super-resolution sensing but also significantly enhances airport safety monitoring capabilities. By implementing the method, the airport can more accurately monitor and identify moving targets, mitigate potential safety risks, and improve operational efficiency and flight safety. Furthermore, the method provides more data support for airport management, enabling more informed decision-making, optimized resource allocation, and enhanced service quality, thereby ultimately advancing intelligent and automated airport operations.

The technical solution of the present disclosure is as follows:

The present disclosure provides a method for multi-dimensional super-resolution target sensing based on 5G AeroMACS. The method includes:
  S1, modulating data to be transmitted into a plurality of OFDM symbols using the 5G AeroMACS and transmitting the OFDM symbols.
  S2, receiving the OFDM symbols in the air via a plurality of receiving antennas, performing data recovery and stacking recovered data into a 3D data tensor, and storing the 3D data tensor into a 3D complex matrix.
  S3, constructing a signal subspace, a noise subspace, and a 3D spectral peak search function based on the 3D complex matrix to obtain a multi-dimensional super-resolution spectrogram.
  S4, obtaining a final target sensing result by using a three-dimensional constant false alarm rate (3D-CFAR) detection algorithm.
  S5, determining an adjusted operating power level of each of bird-repelling devices in different regions based on the target sensing result; controlling an operation of the bird-repelling device in a designated region based on the adjusted operating power level to disperse birds in the designated region; and generating a vehicle regulation instruction based on the target sensing result, and sending the vehicle regulation instruction to a plurality of UAVs to control the plurality of UAVs to drive away from a warning region, the warning region including a runway region where an aircraft is ready to perform at least one of landing and taking off.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
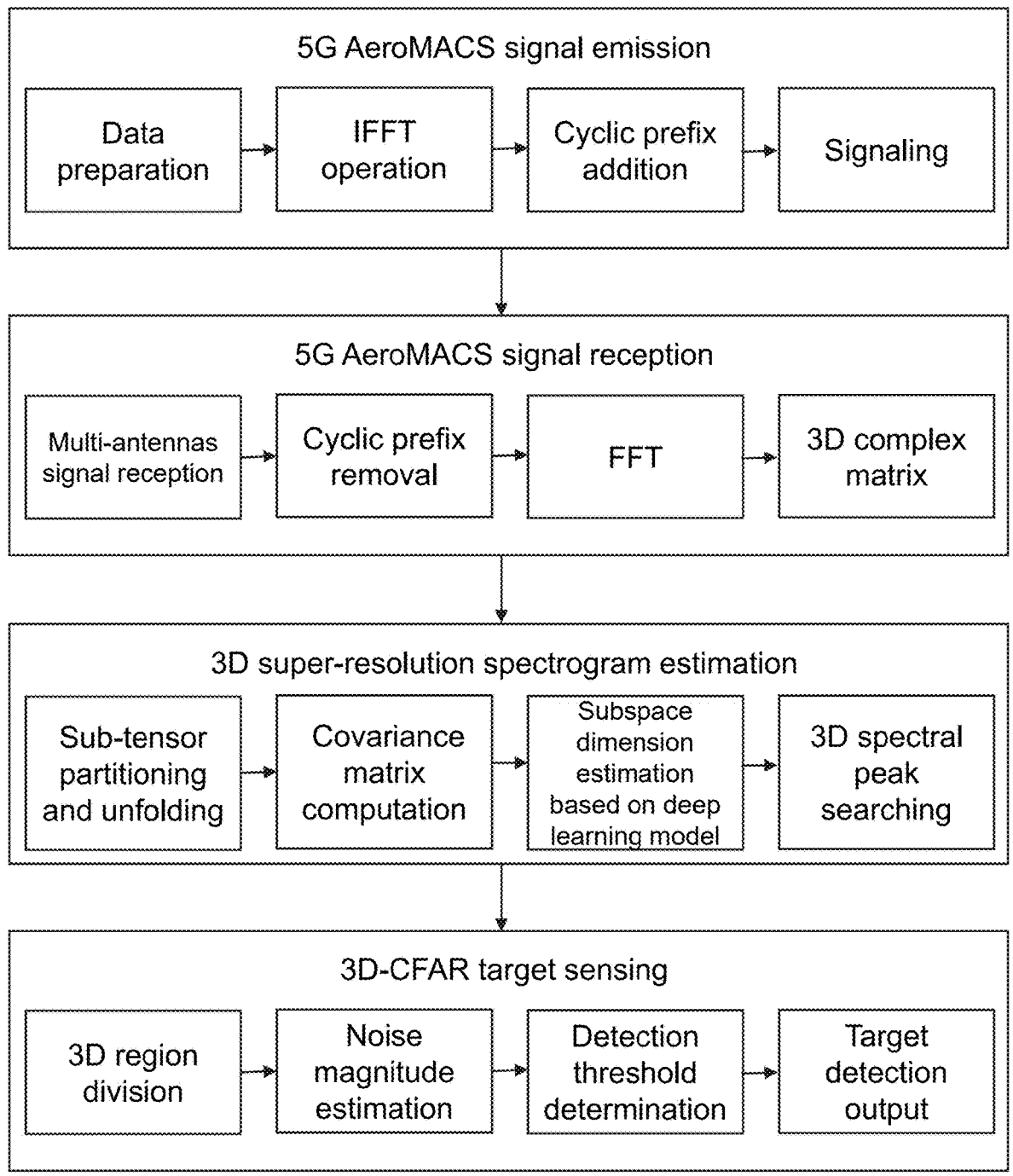
FIG. 1 is a flowchart illustrating an exemplary process for multi-dimensional super-resolution target sensing based on a 5G-enhanced aeronautical mobile airport communications system (5G AeroMACS) according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Given significant size variations of targets in an airport surface region, the application of super-resolution technology becomes particularly essential. The targets require joint identification across multiple dimensions including a range dimension, a velocity dimension, and an angle dimension.

FIG. 1 is a flowchart illustrating an exemplary process for multi-dimensional super-resolution target sensing based on a 5G-enhanced aeronautical mobile airport communications system (5G AeroMACS) according to some embodiments of the present disclosure. As shown in FIG. 1, in the 5G AeroMACS, the transmission and reception of a signal comply with physical layer signal transmission procedures of 5G communications, and incorporate an OFDM technique and integrated communication and sensing.

In some embodiments, process 100 includes operations S1 to S4. Process 100 may be executed by a processor.

S1, modulating data to be transmitted into a plurality of OFDM symbols using the 5G AeroMACS and transmitting the OFDM symbols.

In some embodiments, operation S1 includes operations S1-1 to S1-4.

S1-1, data preparation: mapping the data to be transmitted to M OFDM symbols using the 5G AeroMACS.

The 5G AeroMACS represents an application of 5G technology in aeronautical communications, combining both 5G and AeroMACS technologies.

An aeronautical mobile airport communication system (AeroMACS) refers to a broadband wireless communication system specifically designed for an airport environment.

Orthogonal frequency division multiplexing (OFDM) refers to a multicarrier modulation technique.

In some embodiments, the data preparation phase in the 5G AeroMACS includes mapping the data to be transmitted (e.g., a high-precision digital airport map, a runway occupancy status, a real-time aircraft position, etc.) onto M OFDM symbols.

In some embodiments, each of the M OFDM symbols includes N sub-carriers, and the N sub-carriers are in an aeronautical dedicated frequency range of 5091 MHz-5150 MHz.

In some embodiments of the present disclosure, by setting the sub-carriers in the aeronautical dedicated frequency range of 5091 MHz-5150 MHz, the aeronautical dedicated frequency range can be applied to existing transmitting antennas and receiving antennas without the need for equipment replacement. The aeronautical dedicated frequency range can be directly applied to the present application.

S1-2, inverse fast Fourier transform (IFFT) operation: performing an IFFT operation for each of the OFDM symbols to convert a frequency domain signal to a time domain signal.

The IFFT operation refers to an operation that converts the frequency domain signal to the time domain signal.

In some embodiments, the processor may perform an IFFT operation on each OFDM symbol to convert the frequency domain signal to the time domain signal. The IFFT operation outputs a time domain OFDM symbol with a length N.

S1-3, cyclic prefix addition: adding a cyclic prefix to a tail of each of the M OFDM symbols.

The cyclic prefix (CP) is a signal-processing technique configured to copy the tail of the OFDM symbol to a head of the OFDM symbol.

In some embodiments, to prevent an inter-symbol interference (ISI) caused by a multipath effect, the processor may add a cyclic prefix to the tail of each OFDM symbol.

S1-4, signaling: controlling, based on a transmitting parameter, a plurality of transmitting antennas to send modulated OFDM symbols into the air via the transmitting antennas.

The transmitting parameter is a parameter associated with the transmitting antennas when transmitting the OFDM symbols. In some embodiments, the transmitting parameter includes a transmitting power and a transmitting mode. The transmitting mode may include omnidirectional transmission, directional transmission, multi-beam transmission, etc.

In some embodiments, the processor may take advantage of the low-latency, high-reliability, and large-bandwidth characteristics of the 5G technology to send the modulated OFDM symbols over the air via the transmitting antennas.

In some embodiments, the processor may set the transmitting parameter based on actual application scenarios and needs.

In some embodiments, the processor may obtain a target feature of a target to be inspected from an airport and an meteorological environmental feature of the airport; determine a cell under test (CUT) size based on the target feature and the meteorological environmental feature of the airport; adjust the transmitting parameter based on the CUT size; and control the transmitting antennas to transmit the OFDM symbols based on an adjusted transmitting parameter.

In some embodiments, the processor may obtain target feature of the target to be inspected from the airport and the meteorological environmental feature of the airport.

The target to be inspected refers to a target that needs to be inspected. In some embodiments, the target to be inspected may include a vehicle, a bird, or the like in the airport.

The target feature refers to a feature associated with the target to be inspected. In some embodiments, the target feature may include a size of the target to be inspected and a reflectivity level of a surface of the target to be inspected to an electromagnetic wave.

The meteorological environmental feature may reflect meteorological conditions around the airport. In some embodiments, the meteorological environmental feature may include a wind direction, a wind speed, a temperature, and a humidity around the airport, or the like.

In some embodiments, the processor may determine the CUT size based on the target feature and the meteorological environmental feature of the airport.

A cell under test (CUT) refers to a region used to determine the presence of the target to be inspected. The CUT size reflects a size range of the CUT. In some embodiments, the CUT may be a range cell or a Doppler cell. For example, the processor may divide a geographical region of the airport into grids, and identify the divided grids as CUTs. More descriptions of the CUT may be found in FIG. 4 and related descriptions thereof.

In some embodiments, the processor may determine the CUT size via a first vector database.

The first vector database is a database for determining the CUT size. In some embodiments, the first vector database may include first vectors and first labels corresponding to the first vectors.

In some embodiments, the first vectors are constructed based on historical target features and historical meteorological environmental features, and the first labels are CUT sizes with optimal performance. A CUT size with a relatively short detection time and a relatively high accuracy may be determined as a CUT sizes with optimal performance.

In some embodiments, the processor may construct a plurality of first vectors based on the historical data. For each of the first vectors, the processor may select, from a plurality of historical detections corresponding to the first vector, a historical CUT size with a largest weighted sum of a detection time and a detection coverage ratio as the label corresponding to the first vector. The detection time refers to a time required to complete the detection of all CUTs, and the detection coverage ratio refers to a ratio of a count of detected targets to a count of actual targets. Weight coefficients of the detection time and the detection coverage ratio may be set according to requirements. For example, the weight of the detection time is negative, and the weight of the detection coverage ratio is positive.

In some embodiments, the processor may adjust the transmitting parameter based on the CUT size in a variety of ways. For example, the processor may determine the transmitting parameter corresponding to the CUT size based on a first preset table.

The first preset table is a table for determining the transmitting parameter. In some embodiments, the first preset table includes a plurality of different CUT sizes and a transmitting parameter corresponding to each of the CUT sizes.

In some embodiments, the first preset table may be set based on prior experience.

In some embodiments, the processor may adjust the transmitting parameter based on the CUT size and an estimated target count in a signal coverage region during a preset future time period.

In some embodiments, a duration of the preset future time period may be set based on prior experience. For example, the duration may be 1 min, 10 min, etc.

In some embodiments, the processor may determine, based on historical data, an average value of counts of targets in the signal coverage region in the preset future time period over historical days, and designate the average value as the estimated target count.

In some embodiments, after determining the transmitting parameter via the first preset table, the processor determines whether the estimated target count is greater than a second preset threshold. If the estimated target counts is greater than the second preset threshold, the processor increases the transmitting power based on a second adjustment amount. The second preset threshold and the second adjustment amount may be preset based on prior experience.

In some embodiments, the second adjustment amount is positively correlated to an area of the signal coverage region.

In some embodiments, the processor may control the transmitting antennas to transmit the OFDM symbols based on an adjusted transmitting parameter.

In some embodiments of the present disclosure, by determining the estimated target count in the future time period and adjusting the transmitting parameter based on the estimated target count, signal transmission resources in the signal coverage region can be reasonably allocated, thereby ensuring monitoring effectiveness and reducing unnecessary signal emissions.

S2, receiving the OFDM symbols in the air via a plurality of receiving antennas, performing data recovery and stacking recovered data into a 3D data tensor, and storing the 3D data tensor into a 3D complex matrix.

In some embodiments, operation S2 includes operations S2-1 to S2-3.

S2-1, controlling each of H receiving antennas to receive the OFDM symbols in the air based on a receiving parameter.

The receiving parameter refers to a parameter that controls the receiving antennas for signal acquisition. In some embodiments, the receiving parameter includes a receiving power and a receiving antenna orientation. The processor may determine the receiving parameter based on actual application scenarios and needs.

In some embodiments, the processor uses H receiving antennas for signal reception. The signals received by the H receiving antennas may vary due to the multipath effect.

In some embodiments, each of the receiving antennas corresponds to a data matrix with dimensions N×M, wherein the data matrix includes data of all sub-carriers received by that antenna across the M OFDM symbols. In some embodiments, the processor stacks all H N×M data matrices to form a 3D data tensor with dimensions H×M×N, wherein H denotes a count of the receiving antennas, N denotes a count of sub-carriers in each OFDM symbol, and M denotes a count of the OFDM symbols.

In some embodiments, the processor may create a 3D complex matrix, CIM_3dfft, with dimensions H×M×N.

In some embodiments, a real part of the 3D complex matrix CIM_3dfft is initialized to 0, and an imaginary part is initialized to 0 before being combined with an imaginary unit 1$j$, such that each element in the 3D complex matrix CIM_3dfft is a complex zero.

S2-2: performing truncation, reshaping, cyclic prefix removal, matrix transformation, fast Fourier transform (FFT), and matched filtering sequentially on the OFDM symbols received by each of the receiving antennas in turn.

In some embodiments, the processor may iterate through each of the receiving antennas using a loop structure: for ii in range (H).

In some embodiments, operation S2-2 includes operations S2-2-1 to S2-2-5, which are executed for each receiving antenna.

S2-2-1: truncating initial F samples from each of the OFDM symbols received by each of the receiving antennas, wherein a length of the initial F samples is equal to a length of the transmitted OFDM symbol, and storing the initial F samples in a variable Rx0.

In some embodiments, the processor extracts the initial TxSignal_cp.shape[0] samples from a received signal RxSignal[ii] of an ii-th antenna (where a length of the initial TxSignal_cp.shape[0] samples is equal to a length of the transmitted signal TxSignal_cp) and stores the initial TxSignal_cp.shape[0] samples in variable Rx0.

S2-2-2: reshaping the variable Rx0 into a matrix with dimensions (N, −1) and transposing the matrix to obtain a variable Rx1, wherein −1 denotes an automatically computed matrix dimension to ensure that a total count of elements in the matrix remains unchanged after reshaping.

S2-2-3: removing the cyclic prefix from the variable Rx1 and reshaping the variable Rx1 into a matrix Rx with dimensions (N-CPsize, −1), wherein CPsize denotes a size of the cyclic prefix. Cyclic prefix removal mitigates the multipath effect.

S2-2-4: performing FFT on the matrix Rx to obtain a complex matrix Rx_dem with dimensions (N-CPsize, M).

In some embodiments, the FFT converts time-domain signals to the frequency-domain signals for subsequent processing.

S2-2-5: performing element-wise multiplication between the complex matrix Rx_dem and a complex conjugate (denoted as np.conj(TxData)) of the transmitted signal to cancel out a 5G AeroMACS transmission effect.

In some embodiments of the present disclosure, performing truncation, reshaping, cyclic prefix removal, matrix transformation, FFT, and matched filtering sequentially on the OFDM symbols received by each of the receiving antennas can unify the lengths of the OFDM symbols received by different receiving antennas, thereby facilitating subsequent processing.

S2-3, storing a matched-filtered result in a 3D complex matrix with dimensions H×M×N. In other words, processed data is placed into a corresponding layer of the 3D matrix:

In some embodiments, the processor stores the matched-filtered result the result CIM_2dfft of each receiving antenna into a 3D complex matrix CIM_3dfft. The result of the ii-th receiving antenna is stored into an ii-th layer of the 3D complex matrix CIM_3dfft.

In some embodiments of the present disclosure, by receiving the OFDM symbols and performing a series of data processing operations, and finally storing the matched-filtered result in the 3D complex matrix with dimensions H×N×M can enable the processing results of each receiving antenna to be stored in the 3D complex matrix CIM_3dfft, which is convenient for subsequent analysis and processing.

S3, constructing a signal subspace, a noise subspace, and a 3D spectral peak search function based on the 3D complex matrix to obtain a multi-dimensional super-resolution spectrogram. In some embodiments, operation S3 includes operations S3-1 to S3-4.

In some embodiments, operation S3 includes operations S3-1 to S3-6.

S3-1, partitioning the 3D complex matrix into (N−C+1)(M−S+1)(H−D+1) sub-tensors with a size of C×S×D, wherein 1<C<N, 1<S<M, and 1<D<H.

Figure 2:
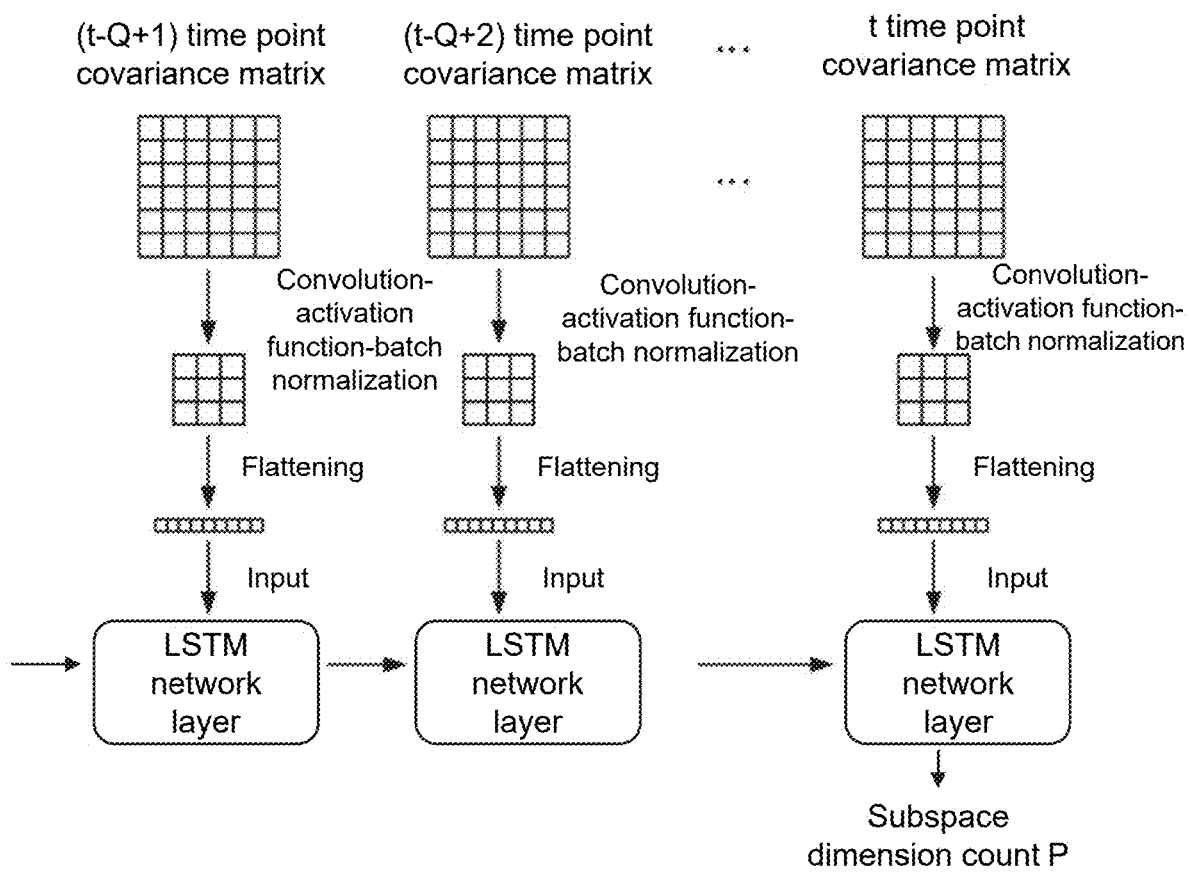
FIG. 2 is a schematic diagram illustrating a deep learning model for estimating a signal subspace dimension count according to some embodiments of the present disclosure.

FIG. 2 is a schematic diagram illustrating a deep learning model for estimating a signal subspace dimension count according to some embodiments of the present disclosure.

Figure 3:
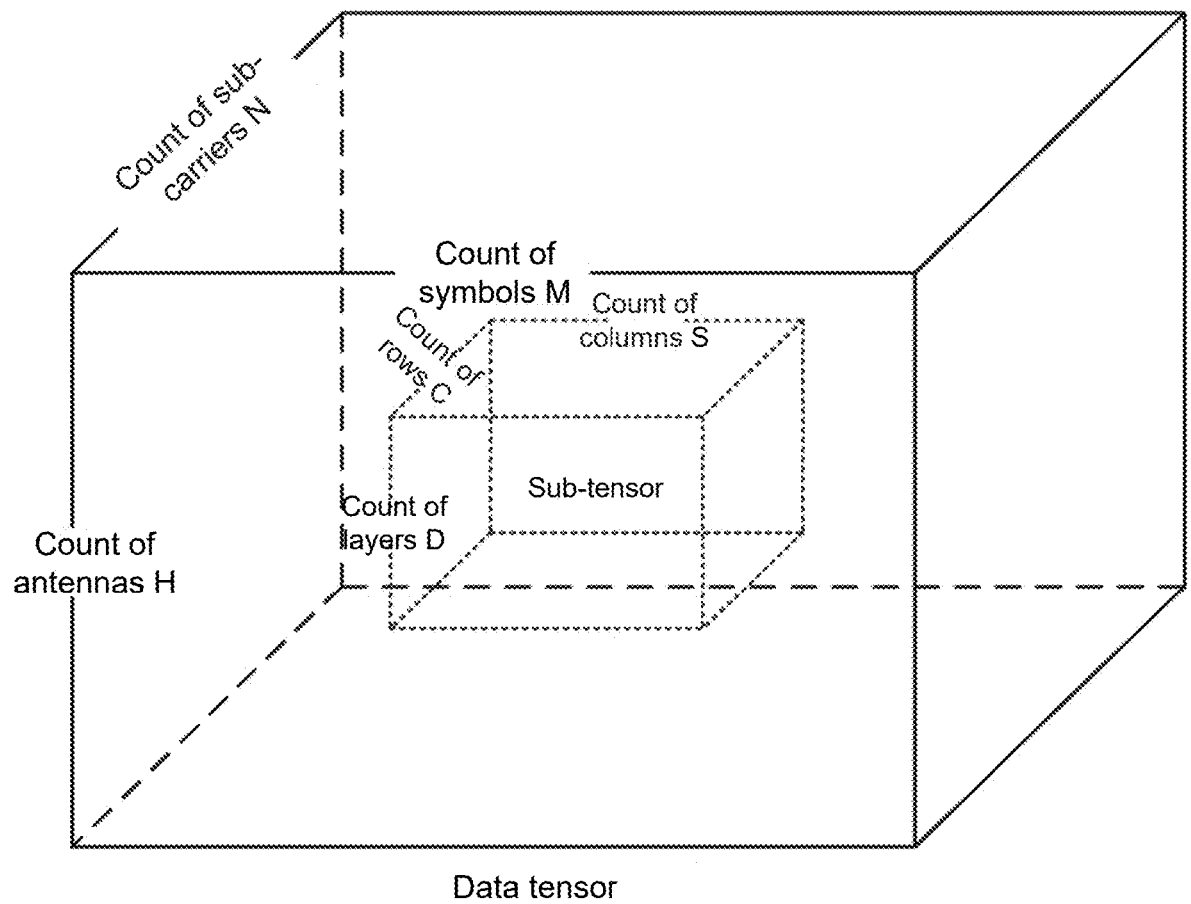
FIG. 3 is a schematic diagram illustrating an exemplary 3D complex matrix and an exemplary 3D sub-tensor according to some embodiments of the present disclosure.

FIG. 3 is a schematic diagram of an exemplary 3D complex matrix and an exemplary 3D sub-tensor according to some embodiments of the present disclosure.

In some embodiments, as shown in FIG. 2 and FIG. 3, the processor partition the 3D complex matrix CIM_3dfft into a plurality of sub-tensors each with a size of C×S×D, wherein in each of the sub-sensors, a count of rows (denoted as C) satisfies 1<C<N, a count of columns (denoted as S) satisfies 1<S<M, and a count of layers (denoted as D) satisfies 1<D<H. In some embodiments, the larger the C, S, and D are, the larger the size of the sub-tensors are, and the fewer a count of sub-tensors is. In some embodiments, the count of sub-tensors is (N−C+1)(M−S+1)(H−D+1).

In some embodiments, the partition starts at a 1 st layer and a 1 st row, and shifts rightward column by column. When reaching a rightmost end, the processor proceeds to a 2nd row. After completing one layer, the processor advances to a next layer, repeating this process until all sub-tensors are partitioned.

A first sub-tensor (denotes as $G_{1,1,1}$), when expanded layer-wise, may be expressed as:

$$G_{1,1,1}=[F_{1,1,1},F_{1,1,2},\ldots,F_{1,1,D}]$$

wherein $F_{1,1,d}$ denotes data in a d-th layer (1<d<D) of the first sub-tensor $G_{1,1,1}$, defined as:

$$F_{1,1,d} = \begin{bmatrix} e_{1,1,d} & \cdots & e_{1,s,d} \\ \vdots & \ddots & \vdots \\ e_{C,1,d} & \cdots & e_{C,S,d} \end{bmatrix}$$

wherein $e_{C,S,d}$ denotes a data value in a c-th row, an s-th column, and the d-th layer of the first data tensor.

A second sub-tensor (denotes as $G_{1,2,1}$), when expanded layer-wise, may be expressed as:

$$G_{1,2,1}=[F_{1,2,1},F_{1,2,2},\ldots,F_{1,2,D}]$$

wherein $F_{1,2,d}$ represents data in a d-th layer of the second sub-tensor $G_{1,2,1}$, defined as:

$$F_{1,2,d} = \begin{bmatrix} e_{1,2,d} & \cdots & e_{1,S+1,d} \\ \vdots & \ddots & \vdots \\ e_{C,2,d} & \cdots & e_{C,S+1,d} \end{bmatrix}$$

A last sub-tensor $G_{N-C+1,M-S+1,H-D+1}$, when expanded layer-wise, may be expressed as:

$$G_{N-C+1,M-S+1,H-D+1}=[F_{N-C+1,M-S+1,H-D+1}, F_{N-C+1,M-S+1,H},\ldots,F_{N-C+1,M-S+1,H}]$$

wherein $F_{N-C+1,M-S+1,d}$ represents data in a d-th layer of the last sub-tensor $G_{N-C+1,M-S+1,H-D+1}$, defined as:

$$F_{N-C+1,M-S+1,d} = \begin{bmatrix} e_{N-C+1,M-S+1,d} & \cdots & e_{N-C+1,M,d} \\ \vdots & \ddots & \vdots \\ e_{N,M-S+1,d} & \cdots & e_{N,M,d} \end{bmatrix}$$

S3-2, unfolding the sub-tensors and concatenating the unfolded sub-tensors column-wise to obtain (N−C+1)(M−S+1)(H−D+1) column vectors.

In some embodiments, the processor combines all sub-tensors by columns, i.e., converts each of the sub-tensors into a column vector:

$$G_{1,1,1}=[f^T_{1,1,1},f^T_{1,1,2},\ldots,f^T_{1,1,D}]^T f_{1,1,d}= \\ [e_{1,1,d},e_{2,1,d},\ldots,e_{C,1,d},e_{1,2,d},e_{2,2,d},\ldots, \\ e_{C,2,d},\ldots,e_{1,S,d},e_{2,S,d},\ldots,e_{C,S,d}]^T$$

S3-3, performing covariance matrix computation.

In some embodiments, the processor may obtain, based on the above vector, a covariance matrix as follows:

$$R = \frac{1}{(N-C+1)(M-S+1)(H-D+1)} \sum_{c=1}^{N-C+1} \sum_{s=1}^{M-S+1} \sum_{d=1}^{H-D+1} g_{c,s,d} g_{c,s,d}^H$$

wherein R denotes the covariance matrix, and $g_{C,S,d}$ denotes a column vector converted from the data value in the c-th row, the s-th column, and the d-th layer of the data tensor.

S3-4, estimating a signal subspace dimension count P using a deep learning model based on a covariance matrix with a time window length Q.

The deep learning model is a model for predicting the signal subspace dimension count P. In some embodiments, the deep learning model may be a machine learning model.

In some embodiments, the deep learning model may be pre-trained based on datasets under different signal-to-noise ratio (SNR) conditions and different target counts, or obtained based on real-world 5G AeroMACS integrated sensing and communication echo data from an airport surface region.

In some embodiments, the deep learning model may be obtained by training based on a large number of training samples with labels. The training samples include covariance matrices computed over the time window length Q under different SNR conditions and different target counts, the labels of the training samples include signal subspace dimension counts P corresponding to the training samples. The labelled training samples may be obtained based on historical data, and the labels of the training samples may be determined based on prior experience or manual input.

In some embodiments, the processor may acquire the deep learning model through a training process. The training process includes: obtaining a plurality of training samples with labels to form a training sample set, and executing a plurality of iterations based on the training sample set. At least one iteration includes: selecting one or more training samples from the training data set, inputting the one or more training samples into an initial deep learning model, obtaining model prediction output(s) corresponding to the one or more training samples, substituting the model prediction output(s) and the label(s) corresponding to the one or more training samples into a formula of a predefined loss function, calculating a value of the loss function, iteratively updating a model parameter of the initial deep learning model based on the value of the loss function until an end-of-iteration condition is satisfied, and ending the iteration to obtain a trained deep learning model. The model parameter of the initial deep learning model may be iteratively updated in a variety of manners. For example, the model parameter of the initial deep learning model may be updated based on a gradient descent manner. The end-of-iteration condition may include the loss function converging, a count of the iterations reaching an iteration count threshold, etc.

In some embodiments of the present disclosure, the deep learning model obtained by training the initial deep learning model is better tailored to actual airport conditions compared to using existing deep learning models, thereby enhancing its applicability.

In some embodiments, inputs of the deep learning model are covariance matrices computed over the time window length Q. For the covariance matrix corresponding to each time point, features of the input covariance matrix is extracted through a convolution-activation function-batch normalization operation, and low-dimensional features are converted into a vector through a flattening operation. A long and short-term memory (LSTM) network layer processes and fuses vectors at a plurality of time points, and the deep learning model outputs the corresponding signal subspace dimension count P.

In some embodiments of the present disclosure, using the deep learning model is utilized to estimate the signal subspace dimension count P improves target detection accuracy and contributes to higher automation levels.

S3-5: decomposing eigenvalues of the covariance matrix, constructing the signal subspace, denoted as $U_s$, by using eigenvectors corresponding to P largest eigenvalues, and constructing the noise subspace, denoted as $U_n$, using (N−C+1)(M−S+1)(H−D+1)−P remaining eigenvectors:

$$R=V\Lambda V^H$$

wherein, V denotes an eigenvector matrix, and $\Lambda$ denotes a diagonal eigenvalue matrix.

The eigenvectors corresponding to the largest P eigenvalues are utilized to construct the signal subspace $U_s$, and the remaining (N−C+1)(M−S+1)(H−D+1)−P eigenvectors are used to construct the corresponding noise subspace $U_n$.

S3-6, constructing a 3D spectral peak search function to obtain a radar vectoring area (RVA) spectrogram.

The RVA spectrogram is a multi-dimensional super-resolution spectrogram that is configured as an input to a 3D-CFAR detection algorithm in S4.

In some embodiments, the processor constructs a corresponding 3D time-delay-Doppler search column vector, which may be represented as:

$$h_{\tau,f_d,\theta}=a_A(\theta)\otimes[a_R(\tau)\otimes a_V(f_d)]$$

wherein, $$a_A(\theta) = \exp\left(\tilde{j} \cdot 2 \cdot \pi \frac{\Delta d}{\lambda} \cdot [0, 1, \ldots, D-1]^T \cdot \sin\theta\right)$$

$$a_R(\tau) = \exp(-\tilde{j} \cdot 2 \cdot \pi \cdot [0,1,\ldots,C-1]^T \cdot \tau)\sigma_R(\tau) = \exp(-\tilde{j} \cdot 2 \cdot \pi \cdot [0,1,\ldots,C-1]^T \cdot \tau)$$

$$a_V(f_d) = \exp(\tilde{j} \cdot 2 \cdot \pi \cdot [0,1,\ldots,S-1]^T \cdot f_d) a_V(f_d) = \exp(\tilde{j} \cdot 2 \cdot \pi \cdot [0,1,\ldots,S-1]^T \cdot f_d)$$

In some embodiments, the 3D spectral peak search function may be represented by:

$$P(\tau, f_d, \theta) = \frac{1}{h_{\tau,f_d,\theta}^H U_n U_n^H h_{\tau,f_d,\theta}}$$

wherein $\tau$ denotes a time delay of a target, $f_d$ denotes a Doppler frequency shift of the target, $\theta$ denotes an angle parameter of the target, $h_{\tau,f_d,\theta}$ denotes a 3D time-delay-Doppler search column vector, $j$ denotes an imaginary unit, $\Delta d$ denotes an element spacing of an antenna array, $\lambda$ denotes a wavelength of a 5G AeroMACS signal.

S4, obtaining a final target sensing result by using a three-dimensional constant false alarm rate (3D-CFAR) detection algorithm.

In some embodiments, operation S4 includes operations S4-1 to S4-7.

S4-1, setting a false alarm probability $P_{f_a}$.

The false alarm probability $P_{f_a}$ refers to a probability of misjudging noise or clutter as the target. In some embodiments, the false alarm probability $P_{f_a}$ may be determined based on actual application scenarios and needs.

S4-2, preprocessing the RVA spectrogram.

In some embodiments, the processor performs necessary preprocessing on the RVA spectrogram. For example, the preprocessing may include zero-padding around edges of the RVA spectrogram to reduce a boundary effect.

S4-3, determining a plurality of detection regions.

Figure 4:
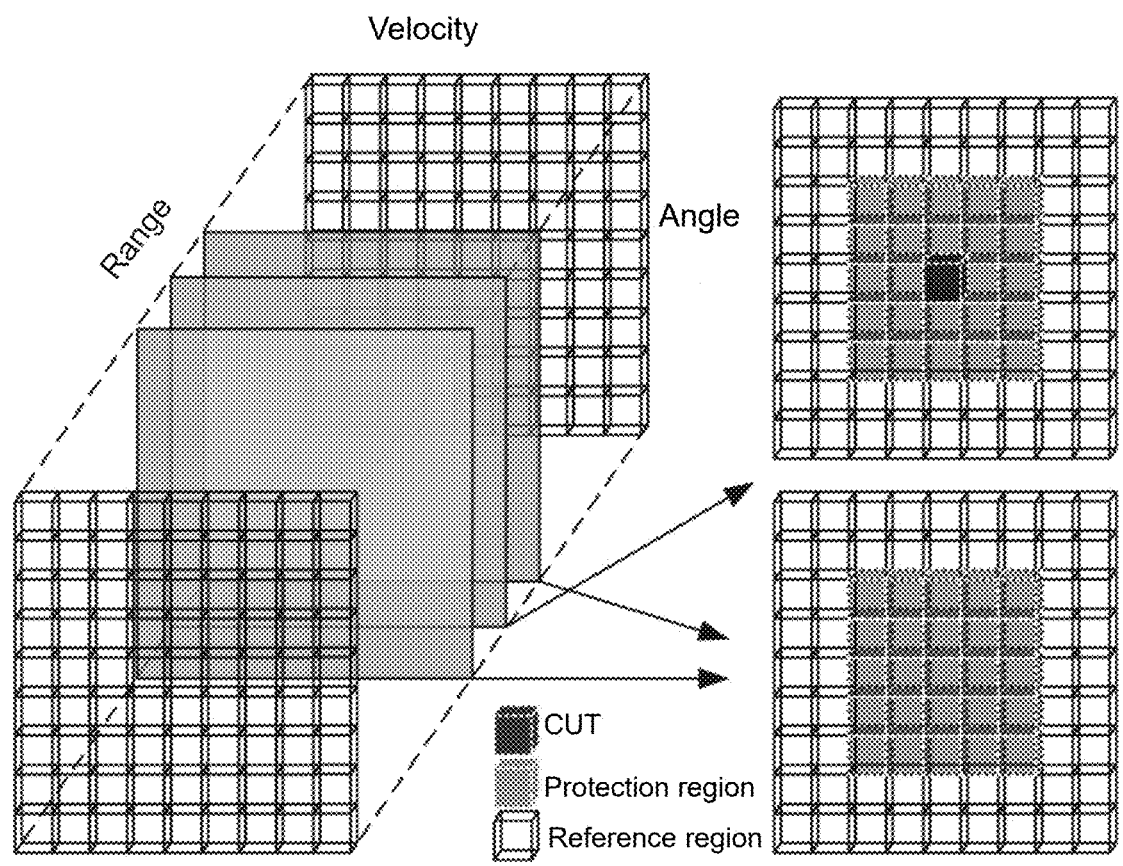
FIG. 4 is a schematic diagram illustrating the division of a detection region, a protection region, and a reference region of a data tensor according to some embodiments of the present disclosure.

FIG. 4 is a schematic diagram illustrating the division of a detection region, a protection region, and a reference region of a data tensor according to some embodiments of the present disclosure. As shown in FIG. 4, the processor may determine a plurality of detection regions. Each of the detection regions includes a CUT, and a protection region and a reference region corresponding to the CUT. For each CUT in the RVA spectrogram, the protection region is symmetrically arranged around the each CUT with widths $W_R$, $W_V$, and $W_A$ in a range dimension, a velocity dimension, and an angular dimension, respectively.

In some embodiments, the processor may determine edge lengths of the reference region in the range dimension, the velocity dimension, and the angular dimension, respectively. For example, the edge lengths of the reference region in the range dimension, the velocity dimension, and the angular dimension are $L_R$, $L_V$, and $L_A$, respectively.

S4-4, noise magnitude estimation.

In some embodiments, the processor determines a weighted value of signal strengths in each of the detection regions during a time window length Q, and designates the weighted value as an average background clutter level Z of the detection region.

Merely by way of example, the average background clutter level Z may be determined by the following equation:

$$Z = \frac{1}{Q \cdot (L_R \times L_V \times L_A - W_R \times W_V \times W_A)}$$

$$\sum_{q=1}^{Q} \sum_{i=-\frac{L_R}{2}}^{\frac{L_R}{2}} \sum_{j=-\frac{L_V}{2}}^{\frac{L_V}{2}} \sum_{k=-\frac{L_A}{2}}^{\frac{L_A}{2}} \zeta^{q-1} \prod(i,j,k) \cdot |y_{i,j,k}(q)|^2$$

wherein $\zeta$ represents a time-weighted forgetting factor, $y_{i,j,k}(q)$ represents a signal strength of a cell with a range dimension index i, a velocity dimension index j, and an angular dimension index k at a q-th time point in a current detection region, $\pi(i,j,k)$ represents a weight value indicating whether the cell with the range dimension index i, the velocity dimension index j, and the angular dimension index k. If the cell is the CUT or the cell is located in the protection region, $\pi(i,j,k)=0$. If the cell is located in the reference region $$\prod(i,j,k) = \frac{1}{\sqrt{2\pi\sigma_R^2}} e^{-\frac{i^2}{\sigma_R^2}} \cdot \frac{1}{\sqrt{2\pi\sigma_V^2}} e^{-\frac{j^2}{\sigma_V^2}} \cdot \frac{1}{\sqrt{2\pi\sigma_A^2}} e^{-\frac{k^2}{\sigma_A^2}},$$

wherein $\sigma_R$ represents a range-weighted standard deviation, $\sigma_V$ represents a velocity-weighted standard deviation, and $\sigma_A$ represents an angle-weighted standard deviation, which are represented by:

$$\sigma_R = \frac{c}{2N\Delta f}$$

$$\sigma_V = \frac{\lambda}{2MT_{OFDM}}$$

$$\sigma_A = \frac{0.886\lambda}{H\Delta d}$$

wherein c represents a light speed, $\Delta f$ represents a subcarrier spacing of a 5G AeroMACS signal, and $T_{OFDM}$ represents a OFDM symbol duration of the 5G AeroMACS signal.

S4-5, determining a threshold factor based on the false alarm probability, a volume of the reference region, and the time window length Q.

The threshold factor a refers to a threshold value that distinguishes a real target signal from a noise signal in a clutter background.

In some embodiments, in an average weighted case, the threshold factor a is expressed by:

$$\alpha = (L_R \times L_V \times L_A - W_R \times W_V \times W_A)\left(P_{f_a}^{\frac{1}{L_R \times L_V \times L_A - W_R \times W_V \times W_A}} - 1\right)$$

In some embodiments, the threshold factor a is expressed by:

$$\alpha = \mathbb{E}[\Pi(i, j, k)]\left(P_{fa}^{-\frac{1}{\mathbb{E}[\Pi(i,j,k)]}} - 1\right)$$

wherein E[·] represents an expectation operation over a tensor of the weight value.

S4-6, for the CUT in each of the detection regions, determining a detection threshold T based on the threshold factor a and the average background clutter level Z corresponding to the CUT.

In some embodiments, the detection threshold T may be determined by the following equation:

$$T = Z \cdot (a+1)$$

S4-7, target detection.

In some embodiments, the processor compares the signal strength of the CUT in each of the detection regions with the detection threshold. If the signal strength of the CUT exceeds the detection threshold, the CUT is determined to contain a target, and a position of the CUT is recorded as a target position.

In some embodiments, the processor may obtain the signal strengths of each of the CUT in each of the detection regions at a plurality of time points within the time window length Q by querying reception records of the receiving antenna.

In some embodiments, the processor may determine, based on the signal strengths of the CUT in each of the detection regions, an average background clutter level Z at a current time point, and predict average background clutter levels $Z_1, Z_2, \ldots$, and $Z_n$ at a plurality of time points in a preset future time period. More descriptions regarding the determination of the average clutter background level Z may be found in S4-4 and related descriptions thereof.

In some embodiments, the average background clutter levels $Z_1, Z_2, \ldots$, and $Z_n$ at the plurality of time points in the preset future time period may be predicted through cluster analysis.

In some embodiments, the processor may construct a plurality of clustering vectors based on historical signal strengths of a CUT at a plurality of time points within a historical time window length Q, and construct a target vector based on signal strengths of the CUT at a plurality of time points within a current time window length Q. The processor may perform clustering using a clustering algorithm based on the plurality of clustering vectors and the target vector, and obtain a plurality of clusters. The clustering algorithm may include K-Means clustering, or the like In some embodiments, the processor selects clusters containing the target vector as a target cluster. The processor may determine an average value of historical average background clutter levels Z corresponding to all cluster vectors in the target cluster during a historical time period, and designate the average value as the average background clutter levels $Z_1, Z_2, \ldots$, and $Z_n$ at the plurality of time points in the preset future time period corresponding to the target vector. The historical time period shares the same start and end time points as the preset future time period but differs in date.

In some embodiments, a duration of the preset future time period is positively correlated to a time span between the plurality of time points within the time window length Q, and negatively correlated to variation amplitudes of the signal strengths of the CUT at the plurality of time points in the time window length Q.

The time span between the plurality of time points within the time window length Q refers to a time span between any two adjacent time points. The variation amplitude of the signal strengths of the CUT at the plurality of time points within the time window length Q refers to a difference between a maximum signal strength and a minimum signal strength of the CUT within the time window length Q.

In some embodiments of the present disclosure, when the time span between the plurality of time points within the time window length Q is relatively large, it tends to represent an overall trend of change within the time window length Q. Therefore, the duration of the preset future time period may be appropriately extended to avoid reduced prediction accuracy due to an overly short preset future time period. Conversely, if an average value of the variation amplitudes of the signal strengths of the CUT is relatively large, it indicates that electromagnetic influencing factors affecting signal propagation within the signal coverage region are complex and variable during the time window of length Q, making predictions harder in the preset future time period. In this case, appropriately shortening the duration of the preset future time period can ensure the accuracy of prediction results.

In some embodiments, the volume of the reference region varies due to differences between sizes of different CUTs. In some embodiments, the processor may determine the volume of the reference region based on a CUT size. The CUT size of a CUT is also referred to as the size of the CUT. More descriptions of the reference region may be found in S4-3 and related descriptions thereof.

In some embodiments, the processor may determine the threshold factor a based on a preset false alarm probability, the volume of the reference region, and the time window length Q. More descriptions of the threshold factor a may be found in S4-5 and related descriptions thereof.

In some embodiments, the processor may determine the preset false alarm probability based on an environmental feature and a target feature.

The environmental feature refers to environmental conditions around an airport.

In some embodiments, the environmental feature include an electromagnetic environmental feature and a meteorological environmental feature of the airport.

The electromagnetic environment feature reflects a distribution of electromagnetic devices in the airport. The electromagnetic devices may include navigation devices, communication devices, weather radars, etc.

More descriptions of the meteorological environmental feature and the target feature may be found in FIG. 1 and related descriptions thereof.

In some embodiments, the processor may obtain the preset false alarm probability via a second vector database.

The second vector database is a database for determining the preset false alarm probability. In some embodiments, the second vector database may include second vectors and second labels corresponding to second vectors.

In some embodiments, the second vectors are constructed based on historical target features and the historical meteorological environmental features, and the second labels may be historical false alarm probabilities corresponding to the second vectors.

In some embodiments, the processor may construct a plurality of second vectors based on the historical data. For each of the second vectors, the processor may obtain, from a plurality of historical detections corresponding to the second vector, a count of historical detections in which noise or clutter is misclassified as a target, as well as a total count of the plurality of historical detections. A ratio of the count of historical detections in which noise or clutter is misclassified as a target to the total count of the plurality of historical detections is determined as the historical false alarm probability, which is then assigned as the second label corresponding to second vector.

In some embodiments, the processor may select, from the second vector database, a second feature vector that has a highest similarity to the target vector, and determine the label corresponding to the second feature vector with the highest similarity as the preset false alarm probability corresponding to the second target vector.

In some embodiments of the present disclosure, the preset false alarm probability is determined based on the environmental feature and the target feature. Different false alarm probabilities may be determined based on a count of obstacles, etc., in the airport and current real-time weather conditions, thereby ensuring target detection sensitivity while avoiding excessive false alarms.

In some embodiments, for the CUT in each of the detection regions, the processor may determine a future detection threshold in the preset future time period based on the threshold factor and the average background clutter level in the preset future time period. More descriptions regarding the calculation of the detection threshold may be found in S4-6.

In some embodiments, the processor may determine the current detection threshold based on the threshold factor and the average background clutter level at the current time point. More descriptions regarding the determination of the current detection threshold may be found in S4-6.

In some embodiments, for the CUT in each of the detection regions, the processor may generate a plurality of candidate detection thresholds based on the threshold factor and the average background clutter level at the current time point. For each of the plurality of candidate detection thresholds, the processor may determine a predicted false alarm probability for the candidate detection threshold through a threshold model based on the candidate detection threshold, the average background clutter level at the current time point, the average background clutter level in the preset future time period, the environmental feature, and the target feature. The threshold model is a machine learning model. The processor may determine the current detection threshold for the CUT based on the predicted false alarm probability for each of the plurality of candidate detection thresholds.

In some embodiments, the plurality of candidate detection thresholds may be determined by the following equation:

$$T = Z \cdot (a+k)$$

wherein T denotes the candidate detection threshold, Z denotes the average background clutter level at the current time point, a denotes the threshold factor. k may take different values to generate a plurality of different candidate detection thresholds, and the value of k may be determined based on actual application scenarios and requirements.

The threshold model is a prediction model for determining a predicted false alarm probability for a candidate detection threshold. In some embodiments, the threshold model is a machine learning model.

In some embodiments, inputs to the threshold model include the candidate detection thresholds, the average background clutter level Z at the current time point, the average background clutter levels $Z_1, Z_2, \ldots,$ and $Z_n$ at a plurality of points in the preset future time period, the environmental feature, and the target feature. Outputs of the threshold model are the predicted false alarm probabilities for the candidate detection thresholds.

The threshold model may be obtained by training based on a large number of third training samples with third labels. The third training sample is a historical detection threshold for historical detection, an average background clutter level Z at a historical time point, an average background clutter level $Z_1, Z_2, \ldots,$ and $Z_n$ at a plurality of time points within a preset historical time period, historical environmental features, and historical target feature. The third label is a predicted false alarm probability for the historical detection threshold corresponding to the third training sample.

In some embodiments, the processor may cluster the third training samples to obtain a plurality of clusters. For each of the clusters, the processor may obtain a plurality of historical detection records corresponding to a plurality of third training samples in the cluster, determine a ratio of a count of detections in which misclassification of a target occurs, and determined the ratio as the label corresponding to the third training samples within the cluster.

In some embodiments, the processor may obtain a trained threshold model by training an initial threshold model based on the labeled third training samples in a manner similar to the training process of the deep learning model, as may be found in the related descriptions above.

In some embodiments, for each CUT, the processor determines the detection threshold at the current time point based on the predicted false alarm probability for each of the candidate detection thresholds. For example, the processor may select the candidate detection threshold for which the predicted false alarm probability is closest to the preset false alarm probability as the detection threshold for the CUT at the current time point. As another example, the processor may select the candidate detection threshold with a smallest predicted false alarm probability as the detection threshold for the CUT at the current time point.

In some embodiments of the present disclosure, by determining the predicted false alarm probability for the plurality of candidate detection thresholds using a threshold model, a data processing capability and a data analysis capability of the threshold model can be fully leveraged to quickly provide accurate and reliable estimated false alarm probabilities.

In some embodiments, the processor may determine, based on the current detection threshold and the future detection threshold of each CUT, a reception direction for each of a plurality of receiving antennas to receive the 5G AeroMACS signal within a signal coverage region, and control the plurality of receiving antennas to rotate to detect target positions in different regions.

In some embodiments, for each CUT, the processor may determine an average value of the current detection threshold and the future detection threshold corresponding to the CUT, and obtain a plurality of target CUTs for which the average value of the corresponding current detection threshold and the corresponding future detection threshold is greater than a third preset threshold. For each of the receiving antennas, the processor may adjust the reception direction for the receiving antenna to minimize an average distance between the reception direction and the target CUTs.

In some embodiments, the processor may determine the third preset threshold based on prior experience.

In some embodiments of the present disclosure, by determining the reception direction for each of a plurality of receiving antennas to receive electromagnetic signals in the signal coverage region and controlling the plurality of receiving antennas to rotate, the reception directions of the receiving antennas can be adjusted in real time to ensure target detection efficiency of the receiving antennas.

S5, determining an adjusted operating power level of each of bird-repelling devices in different regions based on a target sensing result, one or more bird-repelling devices in a designated region to operate based on the adjusted operating power level to repel birds in the designated region, generating a vehicle regulation instruction based on the target sensing result, and sending the vehicle regulation instruction to a plurality of unmanned inspection vehicles (UAVs) to control the plurality of UAVs to drive away from a warning region.

A bird-repelling device is a device that utilizes ultrasonic waves to repel birds. In some embodiments, a repelling effect of a bird-repelling device is positively correlated to the operating power level of the bird-repelling device. The higher the operating power level is of a bird-repelling device is, the higher an ultrasonic sound pressure level (SPL) is emitted from the bird-repelling device, and the stronger the repelling effect on birds.

In some embodiments, the processor may filter, from the target sensing result, a region where a count of birds is greater than a bird population threshold, and increase the operating power level of the bird-repelling device in the region by a first preset adjustment amount. In some embodiments, the bird population threshold and the first preset adjustment amount may be set based on prior experience. For example, the first preset adjustment amount may be set to 120% of the operating power level.

In some embodiments, the bird population threshold correlates to a frequency of at least one of aircraft takeoffs and aircraft landings within the airport. In some embodiments, the greater the frequency is, the smaller the bird population threshold is. The frequency may be obtained based on historical statistical data.

In some embodiments, the processor may generate a vehicle regulation instruction based on the target sensing result, and send the vehicle regulation instruction to a plurality of UAVs to control the plurality of UAVs to drive away from a warning region.

The warning region refers to a region with potential safety hazards. In some embodiments, the warning region may include a runway region where an aircraft is ready to perform at least one of landing and taking off.

In some embodiments, the processor may determine, based on the target sensing result, whether a UAV is in the warning region. If a UAV is in the warning region, the processor may issue a regulation instruction to control the UAV to drive away from the warning region.

In some embodiments of the present disclosure, based on the target sensing result, the operating power level of the bird-repelling device is dynamically adjusted to effectively prevent interference of birds on the takeoff and landing of aircraft, thereby enhancing airport operational safety.

Example 1

Assuming that a 5G AeroMACS base station operates at 5.1 GHz. One transmitted OFDM frame includes 64 OFDM symbols, each OFDM symbol includes 64 subcarriers, the subcarrier spacing is 60 kHz, the OFDM symbol duration is 16.67 μs, the cyclic prefix (CP) occupies 25% of the symbol duration, and the CP duration is 4.17 μs. The transmitted data is modulated using 16-QAM. The array antenna is a linear array consisting of 16 elements with an inter-element spacing of half a wavelength. For spectrum computation, the count of spectrum points is set to 32 in each of the range, velocity, and angular dimensions.

Single-target scenario: one target exists in the signal coverage region, and parameters of the target are as follows:

Range: 900 meters (m), radial velocity: −20 meters per second (m/s), angle: −32 degrees (°).

Figure 5A:
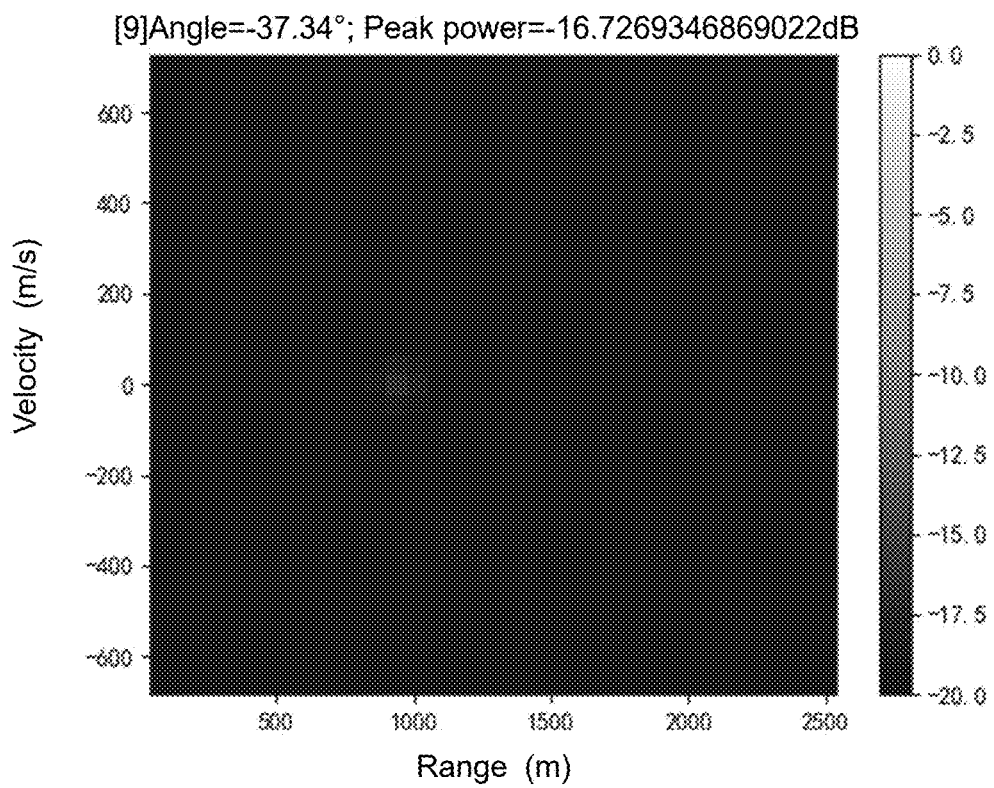
FIGS. 5(a)-5(c) are graphs illustrating estimated results under a single-target scenario according to some embodiments of the present disclosure, wherein parameters of a target are: 900 m, −20 m/s, −32°.
Figure 5B:
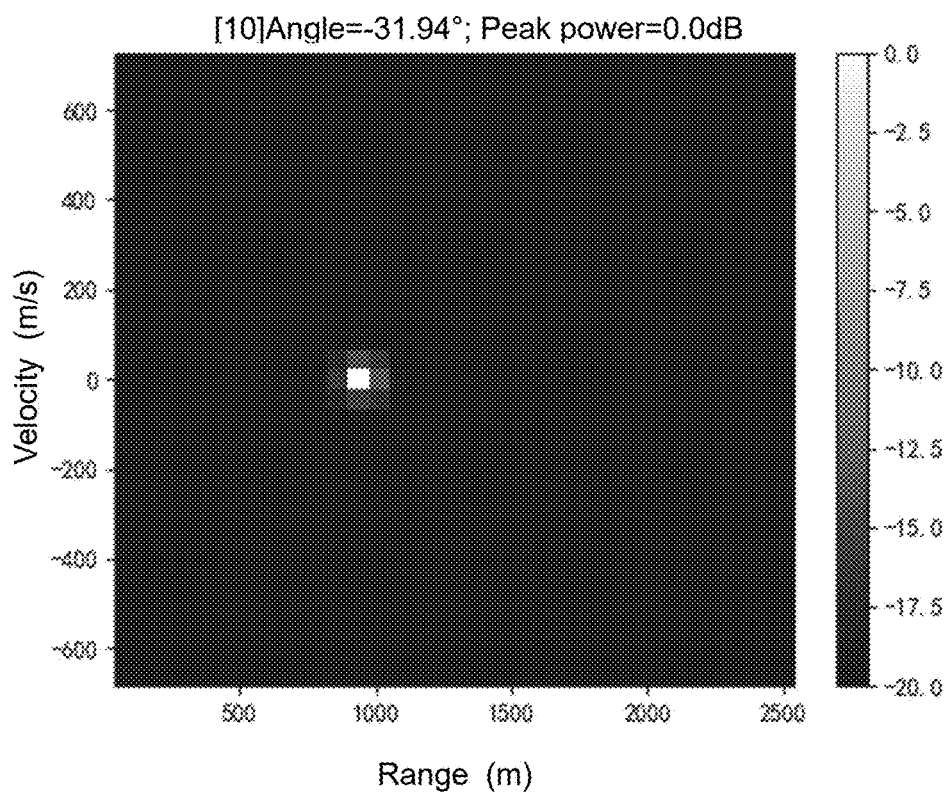
Figure 5C:
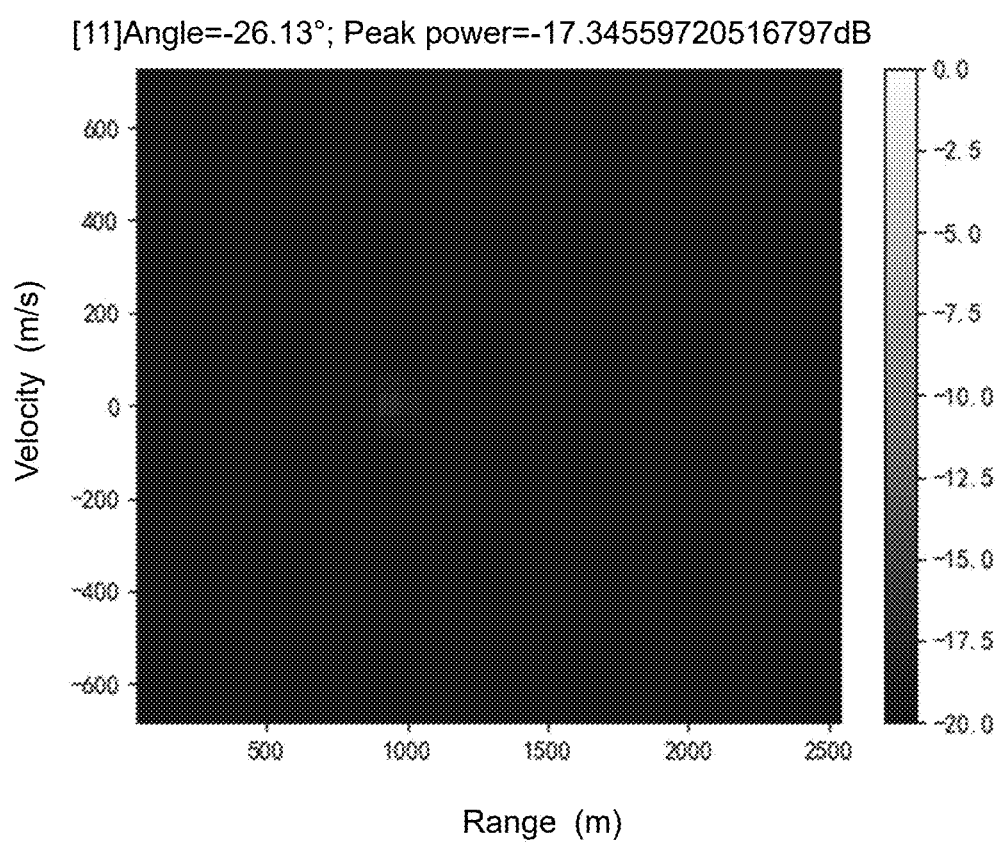
Figure 6A:
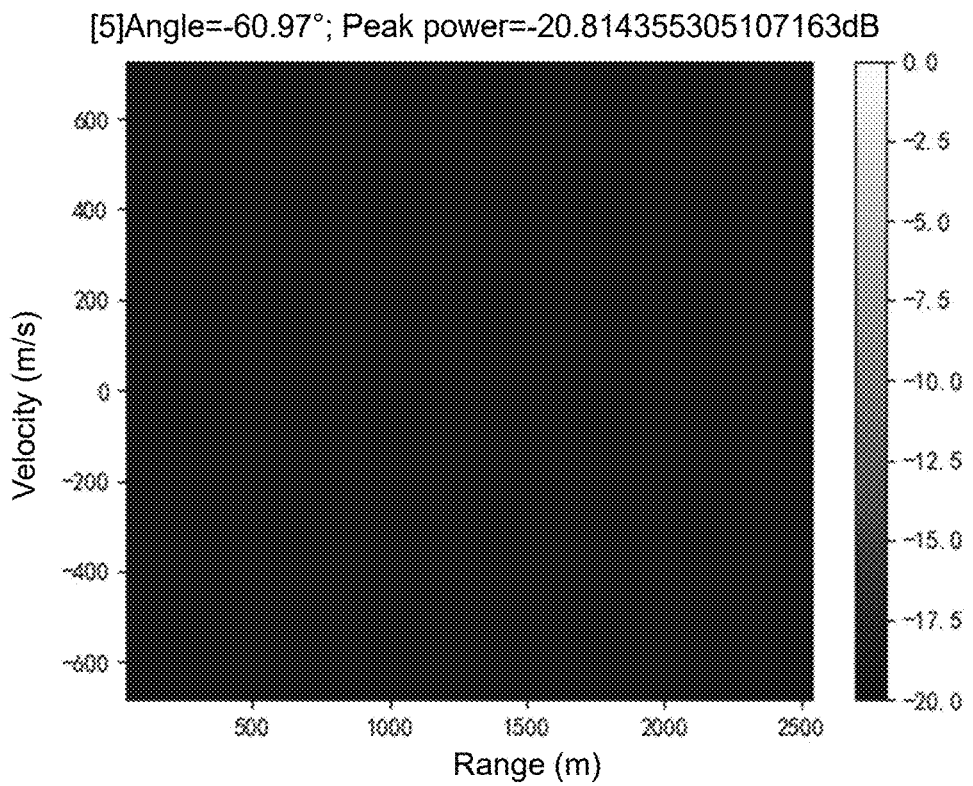
FIGS. 6(a)-6(f) are graphs illustrating estimated results under a multi-target scenario according to some embodiments of the present disclosure, wherein parameters of four targets are: 900 m, −20 m/s, −32°; 600 m, −30 m/s, 9°; 500 m, 40 m/s, 20°; 300 m, 50 m/s, 380.
Figure 6B:
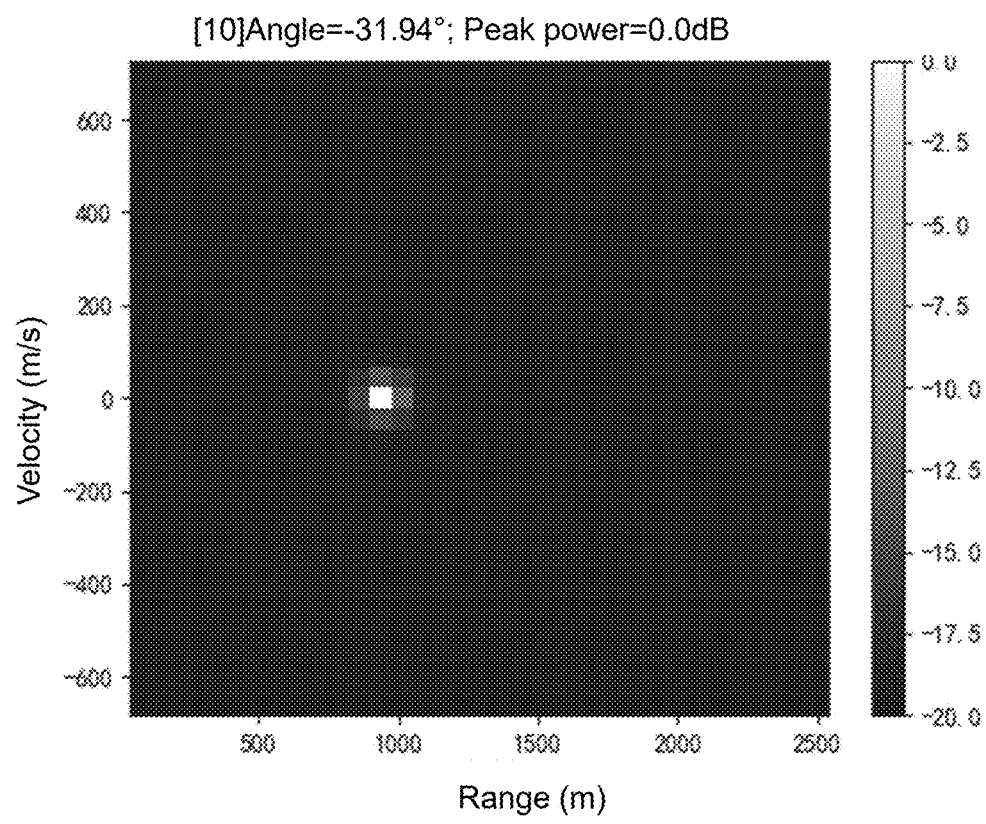
Figure 6C:
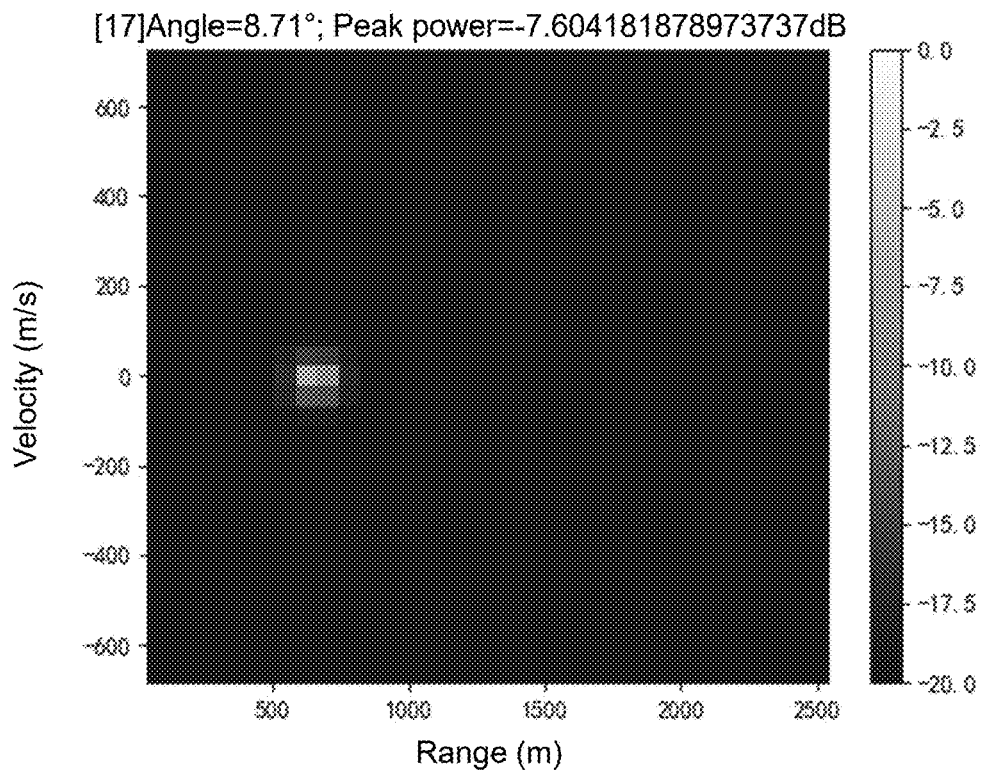
Figure 6D:
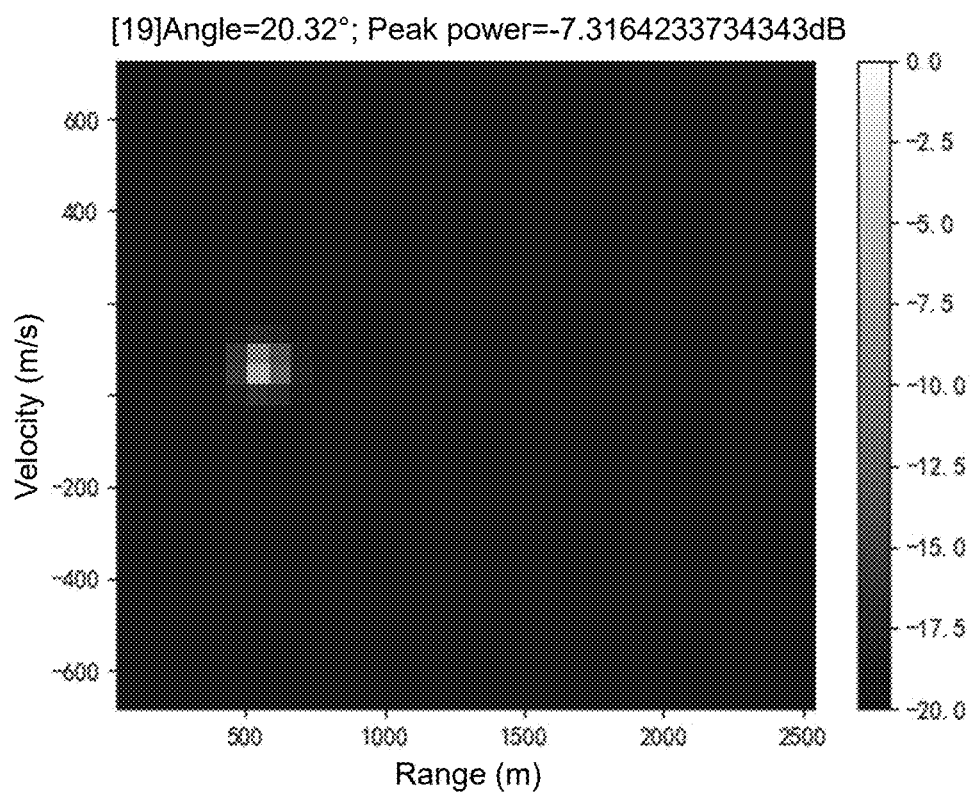
Figure 6E:
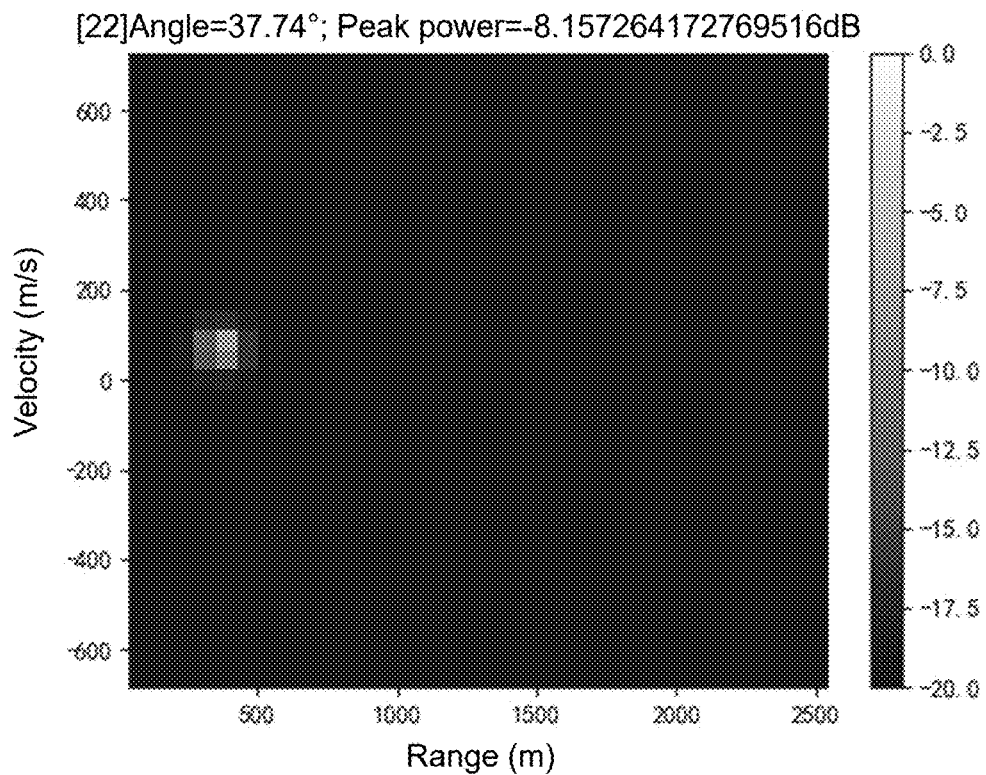
Figure 6F:
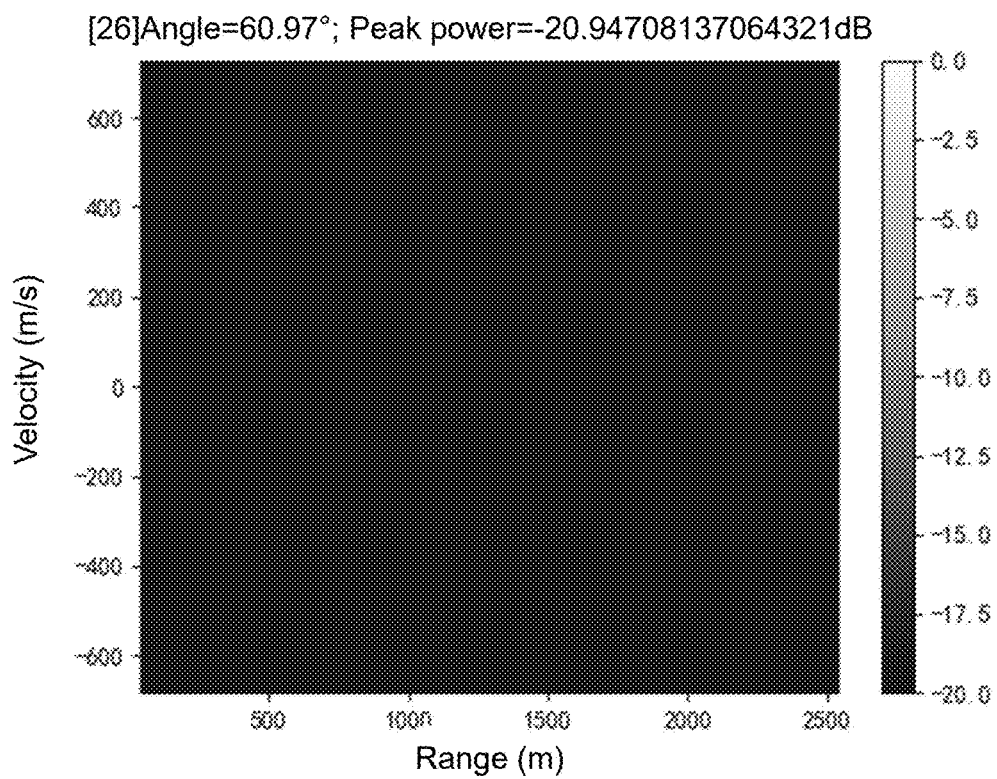

The target count obtained through covariance matrix inference was one. The obtained 3D super-resolution spectrogram is shown in FIG. 5$s(a)$-5$(c)$, displaying slices of the 3D super-resolution spectrogram along the angular dimension at −37.74°, −31.94°, and −26.13°. It may be observed that a sharp spectral peak appears in slice FIG. 5$(b)$, which corresponds to the angle closest to the target's actual angle, while the peak values at other slices FIG. 5$(a)$ and FIG. 5$(c)$ are lower than that at (b).

A point cloud obtained through target detection had a range index of 11, a velocity index of 15, and an angle index of 10.

Multi-target scenario: four targets are assumed to exist in the signal coverage region, with the following parameters:
Range: 900 m; radial velocity: −20 m/s; angle: −32°
Range: 600 m; radial velocity: −30 m/s; angle: 9°
Range: 500 m; radial velocity: 40 m/s; angle: 20°
Range: 300 m; radial velocity: 50 m/s; angle: 38°

Through covariance matrix inference, four targets were identified. The resulting 3D super-resolution spectrogram is shown in FIGS. 6$(a)$-6$(f)$. Slices along the angle dimension at −60.97°, −31.94°, 8.71°, 20.32°, 37.74°, and 60.97° are presented. No distinct spectral peaks appear in slices FIG. 6$(a)$ and FIG. 6$(f)$, which correspond to angle values distant from the actual targets. In contrast, sharp spectral peaks are observed in slices FIGS. 6$(b)$, 6$(c)$, 6$(d)$, and 6$(e)$, each formed at the correct range and radial velocity positions of the respective targets.

Point clouds obtained through target detection had range indices of 11, 7, 6, and 4; velocity indices of 15, 15, 16, and 17; and angle indices of 10, 17, 19, and 22.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for multi-dimensional super-resolution target sensing based on a 5G-enhanced aeronautical mobile airport communications system (5G AeroMACS), comprising:
    S1, modulating data to be transmitted into a plurality of orthogonal frequency division multiplexing (OFDM) symbols using the 5G AeroMACS and transmitting the OFDM symbols;
    S2, receiving the OFDM symbols in the air via a plurality of receiving antennas, performing data recovery and stacking recovered data into a three-dimensional (3D) data tensor, and storing the 3D data tensor into a 3D complex matrix;
    S3, constructing a signal subspace, a noise subspace, and a 3D spectral peak search function based on the 3D complex matrix to obtain a multi-dimensional super-resolution spectrogram;
    S4, obtaining a final target sensing result by using a three-dimensional constant false alarm rate (3D-CFAR) detection algorithm;
    S5, determining an adjusted operating power level of each of bird-repelling devices in different regions based on the target sensing result;
    controlling one or more bird-repelling devices in a designated region based on the adjusted operating power level to repel birds in the designated region; and
    generating a vehicle regulation instruction based on the target sensing result, and sending the vehicle regulation instruction to a plurality of unmanned inspection vehicles (UAVs) to control the plurality of UAVs to drive away from a warning region, the warning region including a runway region where an aircraft is ready to perform at least one of landing and taking off.

2. The method of claim 1, wherein the S1 further includes:
    S1-1, data preparation: mapping the data to be transmitted to M OFDM symbols using the 5G AeroMACS;
    S1-2, inverse fast Fourier transform (IFFT) operation: performing an IFFT operation for each of the M OFDM symbols to convert a frequency domain signal to a time domain signal;
    S1-3, cyclic prefix addition: adding a cyclic prefix to a tail of each of the M OFDM symbols; and
    S1-4, signaling: controlling, based on a transmitting parameter, a plurality of transmitting antennas to send modulated OFDM symbols into the air via the transmitting antennas.

3. The method of claim 2, further comprising:
    obtaining, from an airport, a target feature of a target to be inspected and an meteorological environmental feature of the airport;
    determining a cell under test (CUT) size based on the target feature and the meteorological environmental feature of the airport;
    adjusting the transmitting parameter based on the CUT size; and
    controlling the transmitting antennas to transmit the OFDM symbols based on an adjusted transmitting parameter.

4. The method of claim 3, further comprising:
    adjusting the transmitting parameter based on an estimated target count in a signal coverage region in a preset future time period and the CUT size.

5. The method of claim 2, wherein each of the M OFDM symbols in S1-1 includes N sub-carriers, and the N sub-carriers are in an aeronautical dedicated frequency range of 5091 MHz-5150 MHz.

6. The method of claim 5, wherein the S2 includes:
    S2-1, controlling each of H receiving antennas to receive the OFDM symbols in the air based on a receiving parameter;
    S2-2, performing truncation, reshaping, cyclic prefix removal, matrix transformation, fast Fourier transform (FFT), and matched filtering sequentially on the OFDM symbols received by each of the receiving antennas in turn; and
    S2-3, storing a matched-filtered result in a 3D complex matrix with dimensions H×N×M.

7. The method of claim 6, wherein the S2-2 includes:
    S2-2-1, truncating initial F samples from each of the OFDM symbols received by each of the receiving antennas, wherein a length of the initial F samples is equal to a length of the transmitted OFDM symbol, and storing the initial F samples in a variable Rx0;
    S2-2-2, reshaping the variable Rx0 into a matrix with dimensions (N, −1) and transposing the matrix to obtain a variable Rx1, wherein −1 denotes an automatically computed matrix dimension;

S2-2-3, removing the cyclic prefix from the variable Rx1 and reshaping the variable Rx1 into a matrix Rx with dimensions (N-CPsize, −1), wherein CPsize denotes a size of the cyclic prefix;

S2-2-4, performing FFT on the matrix Rx to obtain a complex matrix Rx_dem with dimensions (N-CPsize, M); and S2-2-5, performing element-wise multiplication between the complex matrix Rx_dem and a complex conjugate of the transmitted OFDM symbol.

8. The method of claim 7, wherein the S3 further includes:

S3-1, partitioning the 3D complex matrix into (N−C+1)(M−S+1)(H−D+1) sub-tensors, wherein a size of each of the sub-sensors is C×S×D, 1<C<N, 1<S<M, and 1<D<H;

S3-2, unfolding the sub-tensors and concatenating the unfolded sub-tensors column-wise to obtain (N−C+1)(M−S+1)(H−D+1) column vectors;

S3-3, performing covariance matrix computation;

S3-4, estimating a signal subspace dimension count P using a deep learning model based on a covariance matrix with a time window length Q;

S3-5, decomposing eigenvalues of the covariance matrix, constructing the signal subspace, denoted as $U_s$, by using eigenvectors corresponding to P largest eigenvalues, and constructing the noise subspace, denoted as $U_n$, using remaining (N−C+1)(M−S+1)(H−D+1)−P eigenvectors; and S3-6, constructing the 3D spectral peak search function to obtain a real-valued amplitude (RVA) spectrogram.

9. The method of claim 8, wherein the deep learning model is obtained by training an initial deep learning model based on a plurality of training samples with labels, the training samples include covariance matrices computed over the time window length Q under different signal-to-noise ratio (SNR) conditions and different target counts, the labels of the training samples include signal subspace dimension counts P corresponding to the training samples;

a training process for the deep learning model includes:
inputting the plurality of training samples with the labels into the initial deep learning model and constructing a loss function based on the labels and an output of the initial deep learning model;

iteratively updating parameters of the initial deep learning model by a gradient descent manner based on the loss function; and completing the training process of the initial deep learning model when a preset condition is satisfied and obtaining the trained deep learning model, wherein the preset condition includes at least one of the loss function converging and a count of iterations reaching a threshold.

10. The method of claim 8, wherein the 3D spectral peak search function in the S3-6 is expressed by an equation including:

$$P(\tau, f_d, \theta) = \frac{1}{h_{\tau,f_d,\theta}^H U_n U_n^H h_{\tau,f_d,\theta}}$$

wherein τ denotes a time delay of a target, $f_d$ denotes a Doppler frequency shift of the target, θ denotes an angle parameter of the target, and $h_{\tau,f_d,\theta}$ denotes a 3D time-delay-Doppler search column vector;

$$h_{\tau,f_d,\theta} = a_A(\theta) \otimes [a_R(\tau) \otimes a_V(f_d)]$$

$$a_A(\theta) = \exp\left(\tilde{j} \cdot 2 \cdot \pi \frac{\Delta d}{\lambda} \cdot [0, 1, \ldots, D-1]^T \cdot \sin\theta\right)$$

$$a_R(\tau) = \exp(-\tilde{j} \cdot 2 \cdot \pi \cdot [0, 1, \ldots, C-1]^T \cdot \tau)$$

$$a_V(f_d) = \exp(\tilde{j} \cdot 2 \cdot \pi \cdot [0, 1, \ldots, S-1]^T \cdot f_d)$$

wherein $\tilde{j}$ denotes an imaginary unit, Δd denotes an element spacing of an antenna array, and λ denotes a wavelength of a 5G AeroMACS signal.

11. The method of claim 10, wherein the S4 further includes:

S4-1, setting a false alarm probability $P_{f_a}$;

S4-2, preprocessing the RVA spectrogram;

S4-3, determining a plurality of detection regions, each of the plurality of detection regions including a cell under test (CUT), and a protection region and a reference region corresponding to the CUT, wherein for each CUT in the RVA spectrogram, the protection region is symmetrically arranged around the each CUT with widths $W_R$, $W_V$, and $W_A$ in a range dimension, a velocity dimension, and an angular dimension, respectively, and the reference region is configured with edge lengths $L_R$, $L_V$, and $L_A$ in the range dimension, the velocity dimension, and the angular dimension, respectively;

S4-4, noise magnitude estimation:
determining a weighted value of signal strengths in each of the detection regions within the time window length Q, and designating the weighted value as an average background clutter level Z of the detection region;

S4-5: determine a threshold factor a based on the false alarm probability $P_{f_a}$, a volume of the reference region, and the time window length Q;

S4-6, for the CUT in each of the detection regions, determining a detection threshold T based on the threshold factor a and the average background clutter level Z;

S4-7, target detection: comparing a signal strength of the CUT in each of the detection regions with the detection threshold T, if the signal strength of the CUT exceeds the detection threshold T, the CUT is determined to contain a target, and a position of the CUT is recorded as a target position.

12. The method of claim 11, further comprising:
obtaining signal strengths of the CUT in each of the detection regions at a plurality of time points within the time window length Q;

determining an average background clutter level at a current time point based on the signal strengths of the CUT in each of the detection regions and predicting an average background clutter level in a preset future time period;

determining the volume of the reference region based on a CUT size;

determining the threshold factor based on a preset false alarm probability, the volume of the reference region, and the time window length Q;

determining, for the CUT in each of the detection regions, a future detection threshold in the preset future time period based on the threshold factor and the average background clutter level in the preset future time period;

determining, for the CUT in each of the detection regions, a current detection threshold at the current time point based on the threshold factor and the average background clutter level at the current time point;

determining a reception direction for each of the receiving antennas to receive the 5G AeroMACS signal in a signal coverage region based on the current detection threshold and the future detection threshold of the CUT in each of the detection regions, and controlling the receiving antennas to rotate to detect target positions in the different regions.

13. The method of claim 12, further comprising: determining the preset false alarm probability based on an environmental feature and the target feature.

14. The method of claim 12, further comprising:

for the CUT in each of the detection regions, generating a plurality of candidate detection thresholds based on the threshold factor and the average background clutter level at the current time point;

for each of the plurality of candidate detection thresholds, determining a predicted false alarm probability for the candidate detection threshold through a threshold model based on the candidate detection threshold, the average background clutter level at the current time point, the average background clutter level in the preset future time period, the environmental feature, and the target feature, wherein the threshold model is a machine learning model; and determining the current detection threshold for the CUT based on the predicted false alarm probability for each of the plurality of candidate detection thresholds.

15. The method of claim 12, wherein for the CUT in each of the detection regions, a duration of the preset future time period is positively correlated to a time span between the plurality of time points in the time window length Q, and negatively correlated to variation amplitudes of the signal strengths of the CUT at the plurality of time points in the time window length Q.

16. The method of claim 12, wherein the average background clutter level Z is expressed by an equation including:

$$Z = \frac{1}{Q \cdot (L_R \times L_V \times L_A - W_R \times W_V \times W_A)}$$

$$\sum_{q=1}^{Q} \sum_{i=-\frac{L_R}{2}}^{\frac{L_R}{2}} \sum_{j=-\frac{L_V}{2}}^{\frac{L_V}{2}} \sum_{k=-\frac{L_A}{2}}^{\frac{L_A}{2}} \zeta^{q-1} \prod(i,j,k) \cdot |y_{i,j,k}(q)|^2$$

wherein $\zeta$ represents a time-weighted forgetting factor, $y_{i,j,k}(q)$ represents a signal strength of a cell with a range dimension index i, a velocity dimension index j, and an angular dimension index k at a q-th time point in a current detection region, $\pi(i,j,k)$ represents a weight value indicating whether the cell with the range dimension index i, the velocity dimension index j, and the angular dimension index k; if the cell is the CUT or the cell is located in the protection region, $\pi(i,j,k)=0$; if the cell is located in the reference region $$\prod(i,j,k) = \frac{1}{\sqrt{2\pi\sigma_R^2}} e^{-\frac{i^2}{\sigma_R^2}} \cdot \frac{1}{\sqrt{2\pi\sigma_V^2}} e^{-\frac{j^2}{\sigma_V^2}} \cdot \frac{1}{\sqrt{2\pi\sigma_A^2}} e^{-\frac{k^2}{\sigma_A^2}},$$

wherein $\sigma_R$ represents a range-weighted standard deviation, $\sigma_V$ represents a velocity-weighted standard deviation, and $\sigma_A$ represents an angle-weighted standard deviation;

$$\sigma_R = \frac{c}{2N\Delta f}$$

$$\sigma_V = \frac{\lambda}{2MT_{OFDM}}$$

$$\sigma_A = \frac{0.886\lambda}{H\Delta d}$$

wherein c represents a light speed, $\Delta f$ represents a subcarrier spacing of the 5G AeroMACS signal, $T_{OFDM}$ represents an OFDM symbol duration of the 5G AeroMACS signal; and the threshold factor a is expressed by an equation including:

$$\alpha = \mathbb{E}[\Pi(i,j,k)]\left(P_{fa}^{-\frac{1}{\mathbb{E}[\Pi(i,j,k)]}} - 1\right)$$

wherein $\mathbb{E}[\cdot]$ represents an expectation operation over a tensor of the weight value.

17. The method of claim 16, wherein the detection threshold T is expressed by an equation including:

$$T = Z \cdot (a+1)$$

18. A system for multi-dimensional super-resolution target sensing based on a 5G AeroMACS, comprising:

a plurality of receiving antennas configured to transmit OFDM symbols;

a plurality of transmitting antennas configured to receive the OFDM symbols; and a processor configured to:

S1, modulate data to be transmitted into a plurality of orthogonal frequency division multiplexing (OFDM) symbols using the 5G AeroMACS and transmit the OFDM symbols;

S2, receive the OFDM symbols in the air via a plurality of receiving antennas, perform data recovery and stack recovered data into a three-dimensional (3D) data tensor, and store the 3D data tensor into a 3D complex matrix;

S3, construct a signal subspace, a noise subspace, and a 3D spectral peak search function based on the 3D complex matrix to obtain a multi-dimensional super-resolution spectrogram;

S4, obtain a final target sensing result by using a three-dimensional constant false alarm rate (3D-CFAR) detection algorithm;

S5, determine an adjusted operating power level of each of bird-repelling devices in different regions based on the target sensing result;

control one or more bird-repelling devices in a designated region to operate based on the adjusted operating power level to repel birds in the designated region; and generate a vehicle regulation instruction based on the target sensing result, and send the vehicle regulation instruction to a plurality of unmanned inspection vehicles (UAVs) to control the plurality of UAVs to drive away from a warning region, the warning region including a runway region where an aircraft is ready to perform at least one of landing and taking off.

19. A non-transitory computer-readable storage medium storing computer instructions, wherein when reading the computer instructions in the storage medium, a computer executes a method for multi-dimensional super-resolution target sensing based on a 5G AeroMACS, the method comprising:
  S1, modulating data to be transmitted into a plurality of orthogonal frequency division multiplexing (OFDM) symbols using the 5G AeroMACS and transmitting the OFDM symbols;
  S2, receiving the OFDM symbols in the air via a plurality of receiving antennas, performing data recovery and stacking recovered data into a three-dimensional (3D) data tensor, and storing the 3D data tensor into a 3D complex matrix;
  S3, constructing a signal subspace, a noise subspace, and a 3D spectral peak search function based on the 3D complex matrix to obtain a multi-dimensional super-resolution spectrogram;
  S4, obtaining a final target sensing result by using a three-dimensional constant false alarm rate (3D-CFAR) detection algorithm;
  S5, determining an adjusted operating power level of each of bird-repelling devices in different regions based on the target sensing result;
  controlling one or more bird-repelling devices in a designated region based on the adjusted operating power level to repel birds in the designated region; and
  generating a vehicle regulation instruction based on the target sensing result, and sending the vehicle regulation instruction to a plurality of unmanned inspection vehicles (UAVs) to control the plurality of UAVs to drive away from a warning region, the warning region including a runway region where an aircraft is ready to perform at least one of landing and taking off.

* * * * *